United States Patent [19]
Akazawa et al.

[11] Patent Number: 5,742,492
[45] Date of Patent: Apr. 21, 1998

[54] METHOD OF DRIVING VIBRATING COMPRESSORS

[75] Inventors: Naoki Akazawa; Masao Namai, both of Nitta-machi, Japan

[73] Assignee: Sawafuji Electric Co., Ltd.

[21] Appl. No.: 703,643

[22] Filed: Aug. 27, 1996

[30] Foreign Application Priority Data

Aug. 28, 1995 [JP] Japan .................. 7-218824

[51] Int. Cl.$^6$ .................. H02M 3/335; F04B 17/04
[52] U.S. Cl. .................. 363/26; 363/133; 417/417
[58] Field of Search .................. 417/417, 552, 417/363, 410; 310/21; 363/24, 26, 133, 25; 318/114, 129, 134

[56] References Cited

U.S. PATENT DOCUMENTS

| | | | |
|---|---|---|---|
| 4,320,448 | 3/1982 | Okuda et al. | 363/134 |
| 4,632,645 | 12/1986 | Kawakami et al. | |
| 4,706,470 | 11/1987 | Akazawa et al. | 62/209 |
| 5,656,896 | 8/1997 | Ogiwara et al. | 318/114 |

*Primary Examiner*—Adolf Berhane
*Attorney, Agent, or Firm*—McGlew and Tuttle

[57] ABSTRACT

In a method of driving vibrating compressors having such a construction that a-c voltage is fed to a vibrating compressor by converting d-c voltage into a-c voltage with two MOS-FETs, the two MOS-FETs as switching elements are driven to convert d-c voltage into a-c voltage by changing the ON time of each of the MOS-FETs corresponding to suction and compression strokes in one cycle of the vibrating compressor to improve the operating efficiency of the vibrating compressor. To this end, suction and compression time in one cycle of the vibrating compressor is changed by means of a timer IC.

6 Claims, 3 Drawing Sheets

METHOD OF DRIVING VIBRATING COMPRESSORS

BACKGROUND OF THE INVENTION

1. Field of the Invention

This invention relates Generally to a method of driving vibrating compressors, and more particularly to a method of driving vibrating compressors having a vibrating drive coil in a magnetic field where the operating efficiency of the vibrating compressor is improved.

2. Description of the Prior Art

Vibrating compressors generally have such a construction as disclosed in U.S. Pat. No. 4,632,645.

Now, description will be made in the following using reference numerals used in U.S. Pat. No. 4,632,645.

A driving coil 16 is vibratably supported by a mechanical vibrating system via resonating springs 20 and 21 in a magnetic gap 14 between an internal iron core 40 and a ferrite magnet 11.

Alternating current is fed to the driving coil 16 to cause the driving coil 16 to reciprocate in the magnetic gap 14, and the reciprocating motion of the driving coil 16 causes a piston 18 mechanically connected to the driving coil 16 to reciprocate.

At this time, the natural vibration of the reciprocating piston 18 is adapted to coincide with the vibration of the alternating current fed to the driving coil 16, and thus the reciprocating motion of the piston compresses coolant, for example.

Vibrating compressors have heretofore been driven by generating in a complicate circuit configuration an alternating voltage having a frequency agreeing with the mechanical vibration of the vibrating compressor to feed the alternating voltage of that frequency to the vibrating compressor.

Now, the prior-art method of driving vibrating compressors will be described in the following, referring to FIG. 4. In the prior-art vibrating compressor, alternating voltage has been supplied to the vibrating compressor 5 via a transformer 4 by driving two MOS-FETs 2 and 3 by a PWM switching regulator controller IC 1 (TL494) that produces pulses of a duty ratio of 50% where one cycle of the frequency coinciding with the mechanical vibration of the vibrating compressor 5, that is, the reciprocating motion of the piston, is equally divided into the suction time and the compression time, as shown by gate signals of the MOS-FETs 2 and 3 in FIG. 5. Numeral 6 denotes a d-c power supply.

A study conducted by the present applicant, however, revealed that the vibrating compressor, that is, the piston vibrates in such a manner as shown in FIG. 6 in the suction and compression strokes of one cycle of the vibrating compressor, and that generating pulses for driving the two MOS-FETs 2 and 3 by the PWM switching regulator controller IC 1 (TL494) in such a manner that the frequency coinciding with the mechanical vibration of the vibrating compressor 5 is equally divided into the suction and compression strokes, as practiced in the prior-art method of driving vibrating compressors, would lead to lowered efficiency of the vibrating compressor 5.

SUMMARY OF THE INVENTION

It is an object of this invention to cause two MOS-FETs to be driven alternately so as to correspond to a suction time and a compression time of a vibrating compressor.

It is another object of this invention to cause a timer IC to generate ON/OFF outputs corresponding to the suction duration and the compression duration.

DETAILED DESCRIPTION OF THE EMBODIMENT

Figure 1:
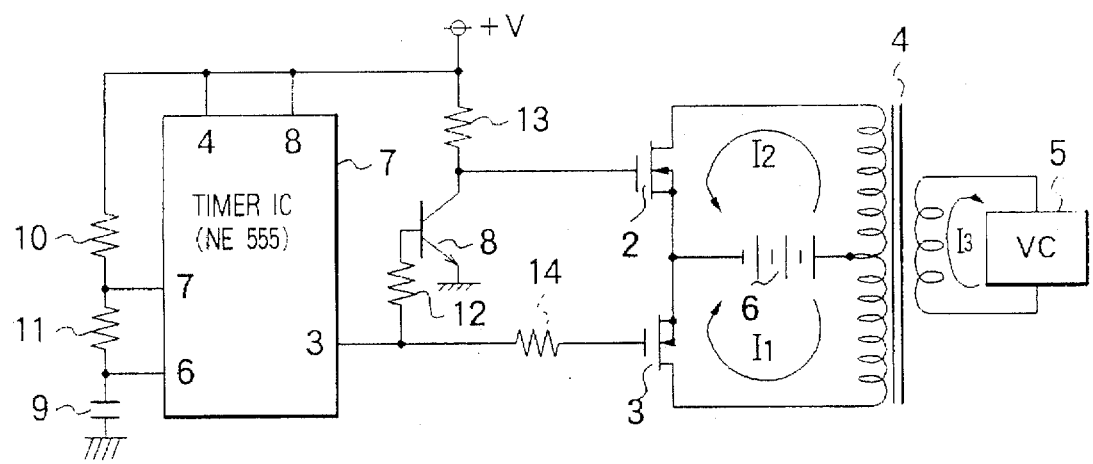
FIG. 1 is a diagram showing a method of driving a vibrating compressor according to this invention.

FIG. 1 shows an embodiment of the method of driving a vibrating compressor of this invention.

Figure 4:
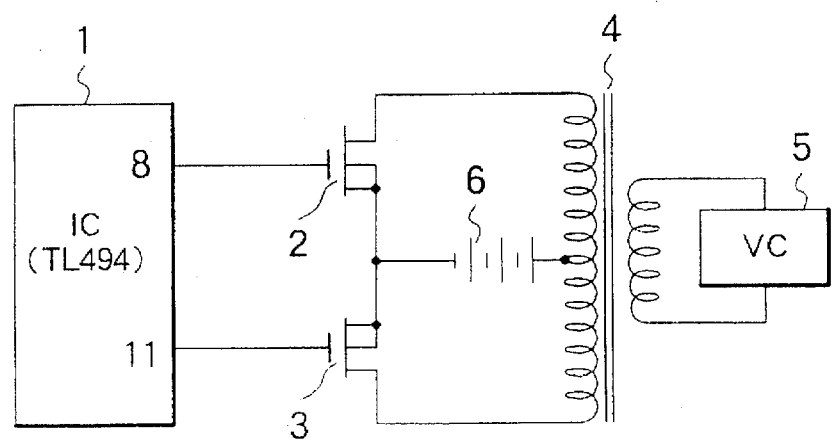
FIG. 4 is a diagram of assistance in explaining a prior-art method of driving a vibrating compressor.
Figure 5:
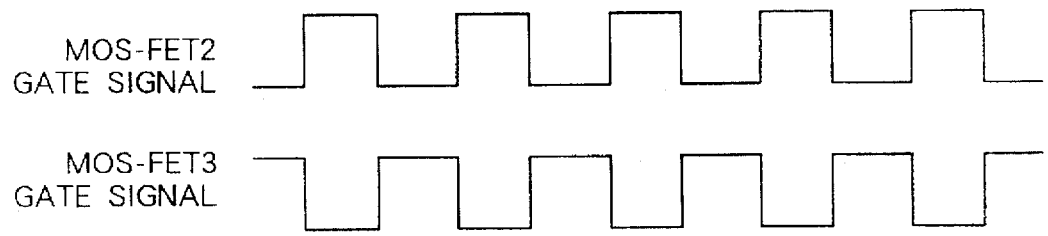
FIG. 5 is a diagram of assistance in explaining the state of driving MOS-FETs in the prior-art method of driving a vibrating compressor.

In the figure, numerals 2 through 5 refer to like parts indicated by like numerals in FIG. 4, numeral 7 refers to a time IC, 8 to a transistor as a pulse reversing circuit, 9 to a capacitor, and 10 through 14 to resistors, respectively.

The timer IC 7 (NE555, for example) operates as an astable multivibrator, the ON/OFF time of whose output is determined by the resistance values R10 and R11 of resistors 10 and 11, and the capacitance C9 of a capacitor 9, both connected to the pin numbers 6 and 7 thereof in such a manner as shown in the figure; and is normally expressed by $$ON\ time\ T1 = 0.693(R10 + R11) \cdot C9$$

and $$OFF\ time\ T2 = 0.693 \cdot R11 \cdot C9$$

The MOS-FETs 2 and 3 are connected in the so-called push-pull fashion. The MOS-FET 3 is turned on by an H-level pulse signal ((1) of FIG. 2) generated on the pin number 3 of the timer IC 7, while the transistor 8 is turned on by that pulse signal, causing the MOS-FET 2 to be turned off. On the contrary, the MOS-FET 3 is turned off by a pulse signal of L level generated on the pin number 3 of the timer IC 7, while the transistor 8 is turned off by the same pulse signal, causing the MOS-FET 2 to be turned on.

Figure 2:
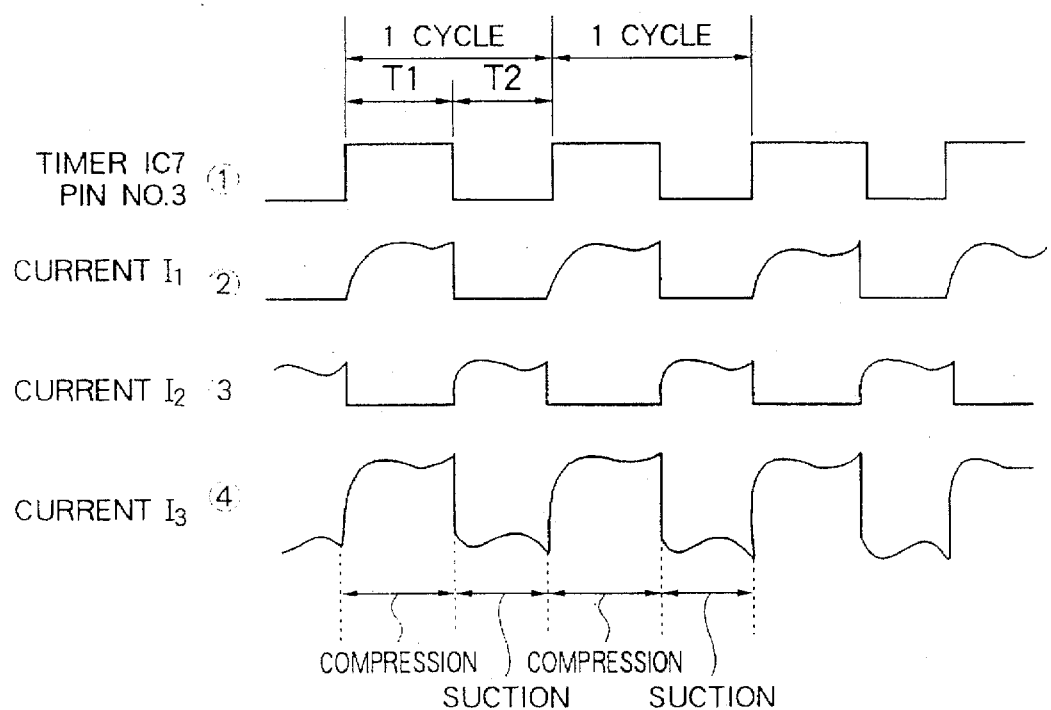
FIG. 2 is a diagram of assistance in explaining waveforms of each circuit.

When the MOS-FET 2 is turned on, therefore, a current $I_2$ as shown by (3) of FIG. 2 flows, changing over the vibrating compressor 5 to the suction stroke. When the MOS-FET 3 is turned on, a current $I_1$ as shown by (2) of FIG. 2 flows, changing over the vibrating compressor 5 to the compression stroke. As the currents $I_1$ and $I_2$ flow, a current 13 as shown by (4) of FIG. 2 flows in the vibrating compressor 5 via a transformer, thereby causing the suction and compression strokes to perform in one cycle.

Figure 6:
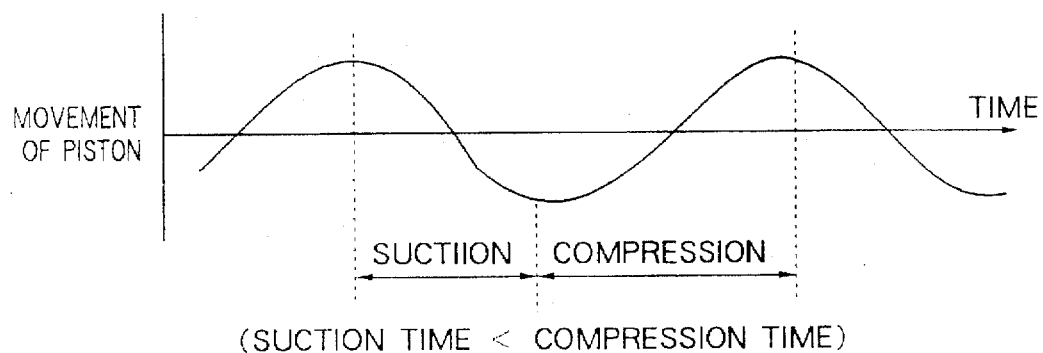
FIG. 6 is a diagram of assistance in explaining the operation of a piston of a vibrating compressor according to this invention.

As described in FIG. 6, the results of a study shows that the vibrating compressor 5 can operate efficiently when the compression and suction time in one cycle of the vibrating compressor 5 are in a predetermined relationship between the suction time and the compression time, i.e., Suction time<compression time at a frequency corresponding to the mechanical vibration of the vibrating compressor 5. (This predetermined relationship between the compression time and the suction time is virtually determined at the design stage.) Consequently, the resistance values R10 and R11 of the resistors 10 and 11, and the capacitance C9 of the capacitor 9 are selected at appropriate values to cause the H-level time T1 of the pulse signal generated on the pin number 3 of the timer IC 7 to coincide with the compression time of the mechanical vibration of the vibrating compressor 5. Needless to say, one cycle of the pulse signal generated on the pin number 3 of the timer IC 7 at this time coincides with one cycle of the mechanical vibration of the vibrating compressor 5.

Figure 3:
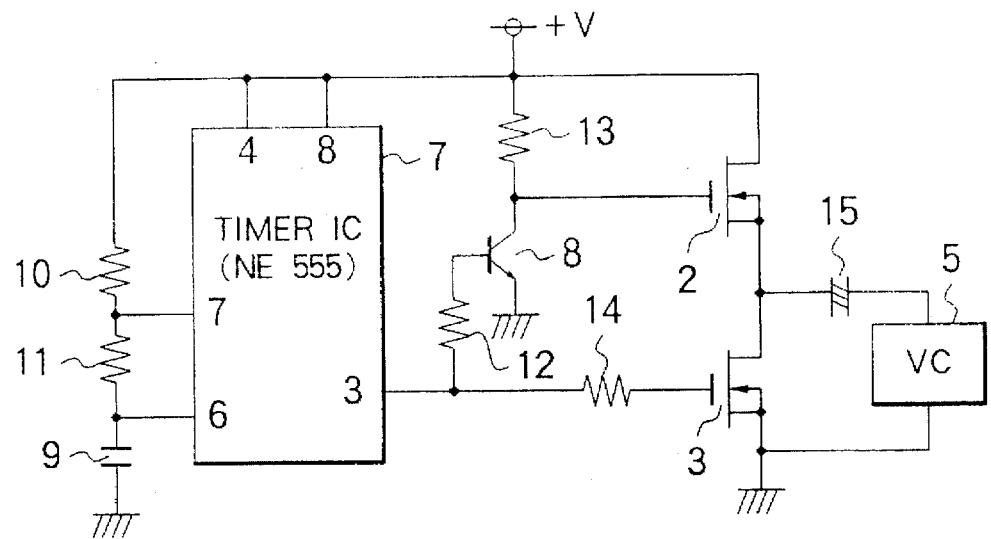
FIG. 3 is a diagram showing another embodiment of the method of driving a vibrating compressor according to this invention.

FIG. 3 shows another embodiment of the method of driving a vibrating compressor according to this invention.

In the figure, two MOS-FETs 2 and 3 are connected in series, and the vibrating compressor 5 is connected in parallel to the MOS-FET 3 via a capacitor 15.

The operations of the timer IC 7, the transistor 8, the MOSFETs 2 and 3, etc. are similar to those in FIG. 1; when the MOSFET 2 is turned on, the vibrating compressor 5 performs almost the same operation as that in FIG. 1 via the capacitor 15. When the MOS-FET 3 is turned on, the vibrating compressor 5 is driven by a voltage charged in the capacitor 15, performing almost the same operation as that in FIG. 1. That is, the vibrating compressor 5 can be operated efficiently by causing the H-level time T1 of the pulse signal generated on the pin number 3 of the timer IC 7 to coincide with the compression time of the mechanical vibration of the vibrating compressor 5 to cause one cycle of the pulse signal to coincide with one cycle of the mechanical vibration of the vibrating compressor 5.

As described above, this invention makes it possible to operate the vibrating compressor efficiently because in driving MOS-FETs as switching elements for converting direct current into alternating current, a timer IC is used to generate pulses to turn on the MOS-FETs to accomplish control in accordance with the movement of the piston, that is, to cause the pulse signals to coincide with the suction time and the compression time of the mechanical vibration of the vibrating compressor.

In other words, in feeding alternating power to the vibrating compressor, a timer IC is caused to generate pulses to switch two MOS-FETs to change the time of suction and compression strokes that are performed in one cycle of the alternating power. Thus, the vibrating compressor can be operated efficiently since alternating voltages for suction and compression strokes can be applied to the vibrating compressor at a predetermined timing.

What is claimed is:

1. A method of driving a vibrating compressor, comprising:

feeding an a-c voltage to a vibrating compressor by converting d-c voltage into a-c voltage;

varying a suction time and a compression time within one cycle of said vibrating compressor;

using two switching devices as a means for converting d-e voltage into a-c voltage;

driving said two switching devices by pulses and alternately turning said switching devices on and off; and using a pulse generated by a timer IC and a pulse reversed in a pulse reversing circuit to drive said switching devices by pulses.

2. A method of driving vibrating compressors as set forth in claim 1, wherein said switching devices are MOS-FETS.

3. A method of driving vibrating compressors as set forth in claim 1, wherein said switching devices are bipolar transistors.

4. A method of driving vibrating compressors as set forth in claim 1, wherein said timer IC generates signals having an ON duration and an OFF duration in accordance with two kinds of time; a first time corresponding to the suction time of a vibrating compressor, and a second time corresponding to the compression time of said vibrating compressor using a resistor and a capacitor connected to terminals of said timer IC.

5. A method of driving vibrating compressors as set forth in claim 1, wherein a transistor for performing ON/OFF operation in accordance with output signals from said timer IC is provided, and said two switching devices are connected in push-pull so that said two switching devices are turned on alternate-ly in accordance with the ON/OFF operation of said transistor to drive said vibrating compressor.

6. A method of driving vibrating compressors as set forth in claim 1, wherein a transistor for performing ON/OFF operation in accordance with output signals from said timer IC, two switching devices connected in series with respect to a power source, and said vibrating compressor having a capacitor connected in series is connected in parallel with any one of said two switching devices.

* * * * *